(12) United States Patent
Callaway (10) Patent No.: US 12,454,456 B2
(45) Date of Patent: Oct. 28, 2025

(54) HYDROGEN CHLORIDE LOOP FUEL REACTION

(71) Applicant: John R. Callaway, Johnston, SC (US)

(72) Inventor: John R. Callaway, Johnston, SC (US)

( * ) Notice: Subject to any disclaimer, the term of this patent is extended or adjusted under 35 U.S.C. 154(b) by 1122 days.

(21) Appl. No.: 17/362,539

(22) Filed: Jun. 29, 2021

(65) Prior Publication Data

US 2022/0073347 A1 Mar. 10, 2022

Related U.S. Application Data (60) Provisional application No. 63/074,518, filed on Sep. 4, 2020.

(51) Int. Cl.
| | |
|---|---|
| *C01B 7/01* | (2006.01) |
| *C01B 7/07* | (2006.01) |
| *F23K 5/00* | (2006.01) |
| *F23M 20/00* | (2014.01) |

(52) U.S. Cl.
CPC ............ *C01B 7/012* (2013.01); *C01B 7/0706* (2013.01); *F23K 5/007* (2013.01); *F23M 20/00* (2015.01); *F23K 2400/10* (2020.05); *F23M 2900/13002* (2013.01)

(58) Field of Classification Search
CPC ...... C01B 7/012; C01B 7/0706; F23M 20/00; F23K 5/007
See application file for complete search history.

(56) References Cited

U.S. PATENT DOCUMENTS

| | | |
|---|---|---|
| 2,444,256 A | 6/1948 | Hill |
| 2,950,180 A | 8/1960 | Kunzer |
| 3,233,978 A | 2/1966 | Alkemade |
| 3,315,440 A | 4/1967 | Alkemade |
| 3,807,139 A | 4/1974 | Di Fiore et al. |
| 3,948,622 A | 4/1976 | Tsao |
| 4,010,017 A | 3/1977 | Loyless |
| 4,113,786 A | 9/1978 | Tsao |
| 4,115,531 A | 9/1978 | Opitz et al. |
| 4,128,701 A | 12/1978 | Maricle |
| 4,233,280 A | 11/1980 | Langens et al. |
| 4,606,742 A | 8/1986 | Dummer et al. |
| 7,208,617 B2 | 4/2007 | Gammie |

FOREIGN PATENT DOCUMENTS

WO  WO-0125143 A1 *  4/2001  ............. C01B 7/012

* cited by examiner

*Primary Examiner* — James A Fiorito
(74) *Attorney, Agent, or Firm* — Jeffrey C. Watson, Esq.; Grell & Watson Patent Attorneys LLC (57) ABSTRACT

A hydrogen chloride loop fuel reaction is designed and configured for turbine/generator combination which can be used for automotive propulsion or as a standalone electrical generation or for auxiliary equipment. A method for providing a hydrogen chloride loop fuel reaction includes creating hydrogen chloride fuel in a sealed furnace vessel, wherein at start up, the sealed furnace vessel is vacuumed out and hydrogen and chlorine are injected into a burner and ignited resulting in the hydrogen chloride fuel in an exhaust stream of the sealed furnace vessel; and looping the hydrogen chloride fuel leaving the sealed furnace vessel in the exhaust stream of the sealed furnace vessel.

14 Claims, 6 Drawing Sheets

HYDROGEN CHLORIDE LOOP FUEL REACTION

CROSS-REFERENCE TO RELATED APPLICATIONS

This application claims benefit to U.S. Provisional Patent Application No. 63/074,518, filed on Sep. 4, 2020, which is incorporated by reference in its entirety.

FIELD OF THE DISCLOSURE

The present disclosure relates to a thermal expansion battery, like for mechanical electrical generation. More specifically, the present disclosure is directed to a hydrogen chloride loop fuel reaction for a thermal expansion battery, like for mechanical electrical generation. This turbine/generator combination can be used for many end uses, including, but not limited to, automotive propulsion or as a standalone electrical generation or for auxiliary equipment.

BACKGROUND

Generally speaking, in electricity generation, a generator is a device that converts motive power (mechanical energy) into electrical power for use in an external circuit. Sources of mechanical energy include steam turbines, gas turbines, water turbines, internal combustion engines, wind turbines and even hand cranks. The first electromagnetic generator, the Faraday disk, was invented in 1831 by British scientist Michael Faraday. Generators provide nearly all the power for electric power grids. The reverse conversion of electrical energy into mechanical energy is done by an electric motor, and motors and generators have many similarities. Many motors can be mechanically driven to generate electricity; frequently they make acceptable manual generators.

A power station, also referred to as a power plant or powerhouse and sometimes generating station or generating plant, is an industrial facility for the generation of electric power. Most power stations contain one or more generators, a rotating machine that converts mechanical power into three-phase electric power. The relative motion between a magnetic field and a conductor creates an electrical current. The energy source harnessed to turn the generator varies widely. Most power stations in the world burn fossil fuels such as coal, oil, and natural gas to generate electricity. Cleaner sources include nuclear power, and an increasing use of renewables such as solar, wind, wave and hydroelectric.

A steam turbine is a device that extracts thermal energy from pressurized steam and uses it to do mechanical work on a rotating output shaft. The steam turbine is a form of heat engine that derives much of its improvement in thermodynamic efficiency from the use of multiple stages in the expansion of the steam, which results in a closer approach to the ideal reversible expansion process. Because the turbine generates rotary motion, it is particularly suited to be used to drive an electrical generator. A steam turbine connected to an electric generator is called a turbo generator.

Electrical power stations use large steam turbines driving electric generators to produce most of the world's electricity. The advent of large steam turbines made central-station electricity generation practical, since reciprocating steam engines of large rating became very bulky and operated at slow speeds. Most central stations are fossil fuel power plants and nuclear power plants; some installations use geothermal steam or use concentrated solar power (CSP) to create the steam. Steam turbines can also be used directly to drive large centrifugal pumps, such as feedwater pumps at a thermal power plant.

The turbines used for electric power generation are most often directly coupled to their generators. As the generators must rotate at constant synchronous speeds according to the frequency of the electric power system, the most common speeds are 3,000 RPM for 50 Hz systems, and 3,600 RPM for 60 Hz systems. Since nuclear reactors have lower temperature limits than fossil-fired plants, with lower steam quality, the turbine generator sets may be arranged to operate at half these speeds, but with four-pole generators, to reduce erosion of turbine blades.

As is commonly known, the use of fossil fuels and nuclear energy to fuel the power plants and/or turbines is reliant upon a limited power source that is non-recyclable. As such, there is clearly a need to provide a power source that is recyclable and/or not reliant upon a limited power source.

The instant disclosure may be designed to address at least certain aspects of the problems or needs discussed above by providing a hydrogen chloride loop fuel reaction.

SUMMARY

The present disclosure may solve the aforementioned limitations of the currently available fuel and power sources by providing a hydrogen chloride loop fuel reaction. Accordingly, in one aspect, the present disclosure embraces a method for providing a hydrogen chloride loop fuel reaction. The method for providing a hydrogen chloride loop fuel reaction generally includes the steps of creating hydrogen chloride fuel in a sealed furnace vessel; and looping the hydrogen chloride fuel leaving the sealed furnace vessel. During the step of creating the hydrogen chloride fuel in the sealed vessel, at start up, the sealed furnace vessel may be vacuumed out and hydrogen and chlorine may be injected into a burner and ignited resulting in the hydrogen chloride fuel in an exhaust stream of the sealed furnace vessel. The step of looping the hydrogen chloride fuel leaving the sealed furnace vessel may be in the exhaust stream of the sealed furnace vessel. This step of looping the hydrogen chloride fuel may generally include: super heating the hydrogen chloride fuel through a super heater coil in direct line of an injection nozzle in the exhaust stream; routing the superheated hydrogen chloride fuel through the injection nozzle; subjecting the superheated hydrogen chloride fuel to light while the superheated hydrogen chloride fuel is in the injection nozzle and in a combustion chamber, whereby bonds of the hydrogen and the chlorine are momentarily separated; combusting the hydrogen and the chlorine while momentarily separated in the combustion chamber, wherein momentarily separated bonds of the hydrogen and the chlorine provide spontaneous combustion of the hydrogen and the chlorine in the combustion chamber; and cooling the hydrogen and the chlorine thereby forming new bonds between the hydrogen and the chlorine for recreating the hydrogen chloride fuel.

One feature of the disclosed method for providing a hydrogen chloride loop fuel reaction may be that the hydrogen chloride fuel is not condensed when looped.

In select embodiments of the disclosed method for providing a hydrogen chloride loop fuel reaction, the combustion chamber may include a secondary ignition source. The secondary ignition source may be configured to ensure the spontaneous combustion of the hydrogen and the chlorine while momentarily separated in the combustion chamber.

In other select embodiments of the disclosed method for providing a hydrogen chloride loop fuel reaction, the light that the superheated hydrogen chloride fuel is subjected to may include, but is not limited to, full spectrum white light, sunlight with high UV spectrum content, selected full spectrum UV bands, the like, and/or combinations thereof. Wherein the light momentarily separating the bonds of the hydrogen and the chlorine may be due to a phenomenon of chlorine in the presents of hydrogen. When the hydrogen and the chlorine are subjected to the full spectrum white light, the sunlight with high UV spectrum content, the selected full spectrum UV bands, the like, and/or the combinations thereof, this phenomenon of chlorine may happen and a release of energy from the chlorine atom may bombard all the hydrogen atoms in its proximity and causes the combination to spontaneously combust. In select embodiments, the light that the superheated hydrogen chloride is subjected to may be created by a UV laser light.

Another feature of the disclosed method for providing a hydrogen chloride loop fuel reaction may be that as the combustion takes place and the bonds of the hydrogen and the chlorine are broken, an exothermic explosion and release of energy from both the hydrogen and the chlorine may occur. Whereby the chlorine may also be the oxidant.

Another feature of the disclosed method for providing a hydrogen chloride loop fuel reaction may be that during the cooling of the hydrogen and the chlorine, atom masses of the hydrogen and the chlorine may regroup, and electromagnetic fields recover. Wherein, chlorine's relationship with hydrogen may have a second phenomenon that chlorine holds the atom masses of the hydrogen within its gravitational field and facilitates the rapid and mostly complete reorganization of a combusted hydrogen atom fusion core. As a result, the continuous use of the hydrogen chloride fuel over and over is possible where the hydrogen chlorine fuel is combusted, and the exhaust returns to the hydrogen chloride fuel.

Another feature of the disclosed method for providing a hydrogen chloride loop fuel reaction may be that a flame propagation of the superheated hydrogen chloride fuel and its energy output is equal to that of gasoline, JP5 jet fuel, fuel oil/diesel, the like, and/or combinations thereof. Whereby, the hydrogen chloride fuel is configured to be used as an economizer core for actual steam production.

Another feature of the disclosed method for providing a hydrogen chloride loop fuel reaction may be that batch production could be long term, including, but not limited to, being configured for weeks at a time of operation.

In select embodiments, the method for providing a hydrogen chloride loop fuel reaction may be designed and configured for a turbine/generator combination. As examples, and clearly not limited thereto, the turbine/generator combination can be used for automotive propulsion or as a standalone electrical generation or for auxiliary equipment.

In other select embodiments, the method for providing a hydrogen chloride loop fuel reaction may be designed and/or configured for use in a thermal expansion battery with mechanical electrical generation. In select embodiments, the thermal expansion battery with mechanical electrical generation may generally include, but is not limited to: a primary hydrogen and chlorine start up injection for injecting the hydrogen and the chlorine into the sealed furnace vessel for creating the hydrogen chloride fuel; the sealed furnace vessel including a turbine in fluid communication with primary hydrogen and chlorine start up injection, where the turbine may be a continuous set RPM turbine that is configured to throttle only to maintain generator output under load; an exhaust condenser cooler configured for the cooling; the injection nozzle for injecting the hydrogen chloride fuel into the turbine; the combustion chamber inside of the turbine; a UV light laser for subjecting the superheated hydrogen chloride fuel to the light while the superheated hydrogen chloride fuel is in the turbine injection nozzle and in the combustion chamber inside of the turbine; a cooled liquid fuel reservoir for storing the hydrogen chloride fuel; a fuel pump configured for circulating and looping the hydrogen chloride fuel; a secondary ignition source in the combustion chamber of the turbine being a piezoelectric or arch igniter; a control valve configured for shutoff; a fuel superheater configured for superheating the hydrogen chloride fuel prior to be injected into the combustion chamber of the turbine; an exterior cooling system configured to aid in the cooling; a generator in communication with the turbine; the thermal expansion battery with a compound battery bank; the like; and/or combinations thereof. Wherein, the thermal expansion battery with mechanical electrical generation may be a closed loop sealed vessel contained in a secondary containment vessel at low pressure with continuous sensor monitoring. Whereby, operating hours of the thermal expansion battery with mechanical electrical generation could be, but is not limited to, from 20,000 hours to 60,000 hours before a maintenance shutdown.

In other select embodiments, the method for providing a hydrogen chloride loop fuel reaction may be designed and configured for use in a gas jet turbine propulsion system. In select embodiments, the gas jet turbine propulsion system may generally include, but is not limited to: a fuel injector; a compression turbine; a combustion propulsion turbine with the combustion chamber; an exhaust compressor turbine; a UV laser for subjecting the superheated hydrogen chloride fuel to the light while the superheated hydrogen chloride fuel is in the fuel injector and in the compression turbine, and in the combustion propulsion turbine; a secondary ignition source in the combustion chamber of the combustion propulsion turbine being a piezoelectric ignition; a turbine output shaft coupled to a load generator; an exhaust expansion chamber and reservoir; a fuel compressor configured to draw the hydrogen chloride fuel from the exhaust expansion chamber and reservoir; a condenser and fuel supply reservoir; a fuel high pressure pump; a fuel super heater; the like; and/or combinations thereof.

In other select embodiments, the method for providing a hydrogen chloride loop fuel reaction may be designed and/or configured for use in a tube type water vessel boiler with steam plant propulsion. The tube type water vessel boiler may be, but is not limited to, a 600 psi or a 1200 psi tube type water vessel boiler. In select embodiments, the tube type water vessel boiler with steam plant propulsion may generally include, but is not limited to: a boiler front injector nozzle configured to include multiple injectors; a fuel super heater; a secondary ignition source in the combustion chamber being a piezoelectric ignition; a UV laser for subjecting the superheated hydrogen chloride fuel to the light while the superheated hydrogen chloride fuel is in the boiler front injector nozzle and the tube type water vessel boiler; an inlet valve; a steam cycle super heater; boiler tubes; a feed water economizer; an exhaust expansion chamber; an exhaust/hot gas forced draft blower with a steam driven turbine configured for forcing hydrogen chloride hot gas atmosphere to return to the boiler front injector nozzle; an exhaust condenser blower with a positive ventilation to condenser fuel reservoir; a fuel condenser and reservoir; a high pressure fuel pump; normal steam plant support machinery including a condenser, a feed pump, a fuel pump, and an auxiliary condenser and pump; the like; and/or combinations thereof.

In other select embodiments, the method for providing a hydrogen chloride loop fuel reaction may be designed and configured for use in a fusion energy thermal reactor based steam plant based electrical generation plant. In select embodiments, the fusion energy thermal reactor based steam plant based electrical generation plant may generally include, but is not limited to: a high-pressure fusion vessel; a high voltage arch igniter; a UV laser for subjecting the superheated hydrogen chloride fuel to the light while the superheated hydrogen chloride fuel is in the high-pressure turbine and the low side velocity turbine; a secondary ignition source in the combustion chamber of the high-pressure turbine and the low side velocity turbine, the secondary ignition source being a piezoelectric igniter; a transformer high voltage arch igniter; vortexing baffles; fuel inlet import configured for high pressure; a plasma discharge port; a plasma supply to the high-pressure turbine and the low side velocity turbine; a dual stage turbine pair with a high pressure turbine and a low pressure turbine; an external cooling system; a condenser and fuel reservoir; a high-pressure fuel pump; a fuel injector; a fuel superheater configured to use plasma to heat the hydrogen chloride fuel; the like; and/or combinations thereof.

In other select embodiments, the method for providing a hydrogen chloride loop fuel reaction may be designed and configured for use in a loop fuel low temperature fusion energy reactor.

In other select embodiments, the method for providing a hydrogen chloride loop fuel reaction may be designed and configured for use in an auxiliary, tandem, or standalone superheater. The auxiliary, tandem, or standalone superheater may be designed and/or configured for use at an initial startup until primary systems are at full operating temperature and speed. The auxiliary, tandem, or standalone superheater may include, but is not limited to, a CNG or propane superheater; a tandem or alongside superheater; and an electrical heating coils superheater.

In select embodiments, the CNG or propane superheater may generally include, but is not limited to the hydrogen chloride fuel flow under pressure from a pump or a compressor; a secondary ignition source being an igniter; a superheater core; a CNG or propane source; an injector; the superheated hydrogen chloride fuel in route to the injector; a blower motor; and exhaust to atmosphere; the like; and/or combinations thereof. Wherein, the CNG or propane superheater may be configured for startup or for main operation using CNG or propane as a source of heat.

In other select embodiments, the tandem or alongside superheater may include, but is not limited to the hydrogen chloride fuel flow under pressure from the pump or the compressor; the injector; the superheated hydrogen chloride fuel in route to the injector; a UV laser for subjecting the hydrogen chloride fuel to the light; the secondary ignition source being the igniter; the superheater core; the exhaust back to the main condenser; the like; and/or combinations thereof. Wherein, the tandem or alongside superheater may be configured to superheat more of the hydrogen chloride fuel for a larger supply, where the tandem or alongside superheater may be configured to use the same forced draft atmosphere as the boiler and exhaust into the same condensation stream.

In other select embodiments, the electrical heating coils superheater may include, but is not limited to the hydrogen chloride fuel flow under pressure from the pump or the compressor; electrical heating coils; the superheater core; the injector for injecting the superheated hydrogen chloride fuel; the like; and/or combinations thereof. Wherein, the electrical heating coils superheater may be configured to make a single step operation for superheating the hydrogen chloride fuel prior to injection into the combustion chamber.

In another aspect, the instant disclosure embraces the method for providing a hydrogen chloride loop fuel reaction in any of the various embodiments and/or combination of embodiments shown and/or described herein.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-6, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Figure 1:
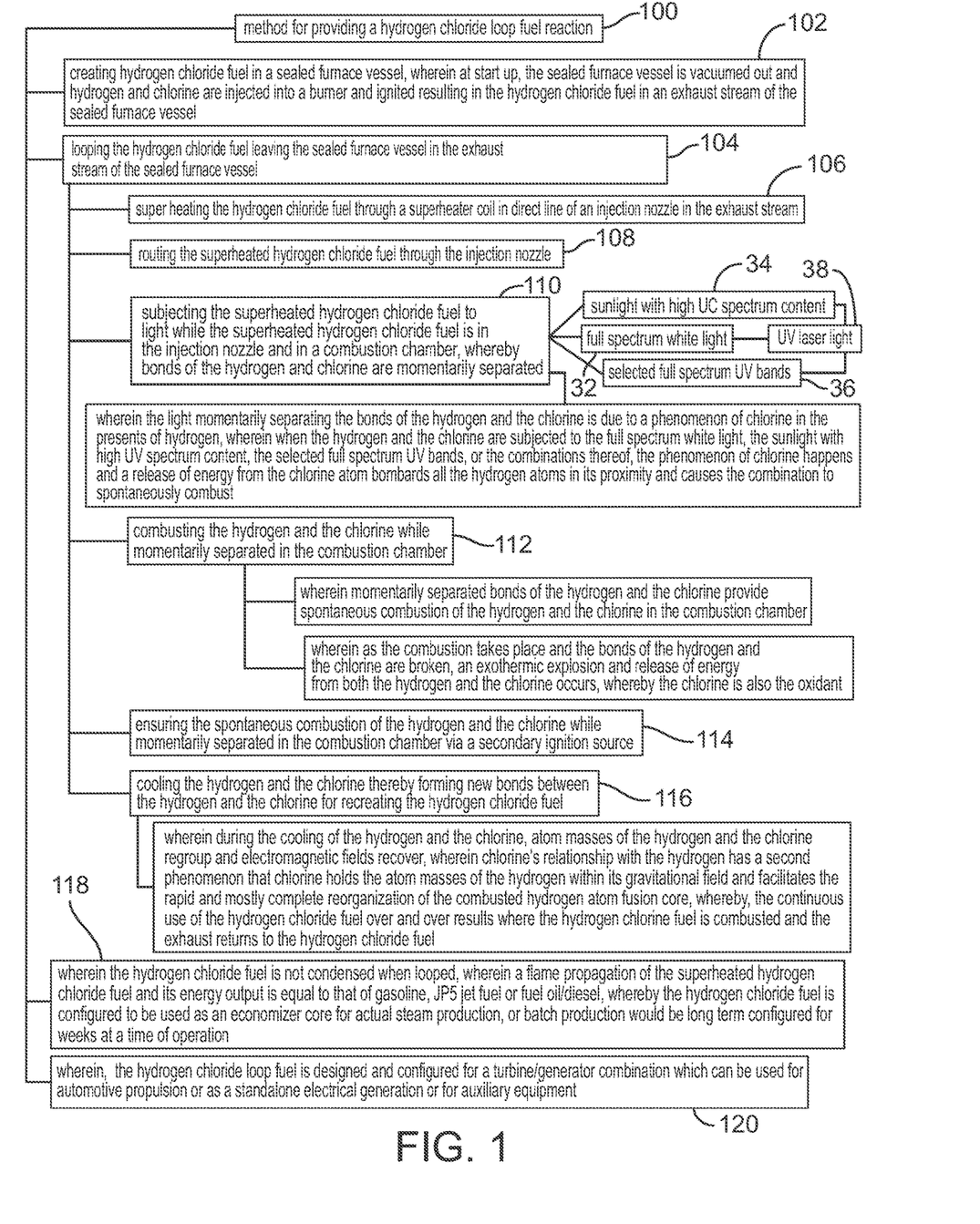
FIG. 1 shows a flow chart of select embodiments of the disclosed method for providing a hydrogen chloride loop fuel reaction according to select embodiments of the instant disclosure.

Referring now specifically to FIG. 1, the present disclosure may solve the aforementioned limitations of the currently available fuel and power sources by method 100 for providing hydrogen chloride loop fuel reaction 10. Method 100 for providing hydrogen chloride loop fuel reaction 10 may generally include the steps of: step 102 of creating hydrogen chloride fuel 12 in sealed furnace vessel 14; and step 104 of looping hydrogen chloride fuel 12 leaving sealed furnace vessel 14. During step 102 of creating hydrogen chloride fuel 12 in sealed vessel 14, at start up, sealed furnace vessel 14 may be vacuumed out and hydrogen 16 and chlorine 18 may be injected into a burner and ignited resulting in hydrogen chloride fuel 12 in an exhaust stream of sealed furnace vessel 14. Step 104 of looping hydrogen chloride fuel 12 leaving sealed furnace vessel 14 may be in the exhaust stream of sealed furnace vessel 14. Step 104 of looping hydrogen chloride fuel 12 may generally include: step 106 of super heating hydrogen chloride fuel 12 through super heater coil 24 in direct line of injection nozzle 26 in the exhaust stream; step 108 of routing the superheated hydrogen chloride fuel 12 through injection nozzle 26; step 110 of subjecting the superheated hydrogen chloride fuel 12 to light 28 while the superheated hydrogen chloride fuel 12 is in injection nozzle 26 and in combustion chamber 40, whereby bonds of the hydrogen 16 and the chlorine 18 are momentarily separated; step 112 of combusting the hydrogen 16 and the chlorine 18 while momentarily separated in combustion chamber 40, wherein momentarily separated bonds of the hydrogen 16 and the chlorine 18 provide spontaneous combustion of the hydrogen 16 and the chlorine 18 in the combustion chamber 40; and step 116 of cooling the combusted hydrogen 16 and the chlorine 18 thereby forming new bonds between the hydrogen 16 and the chlorine 18 for recreating the hydrogen chloride fuel 12.

Still referring to FIG. 1, one feature of method 100 for providing hydrogen chloride loop fuel reaction 10 may be that hydrogen chloride fuel 12 is not condensed when looped in step 104. This is generally shown with step 118 in FIG. 1 of wherein the hydrogen chloride fuel in not condensed when looped.

In select embodiments of method 100 for providing hydrogen chloride loop fuel reaction 10, combustion chamber 40 may include secondary ignition source 30. Secondary ignition source 30 may be configured to ensure the spontaneous combustion of the hydrogen 16 and the chlorine 18 while momentarily separated in combustion chamber 40. Secondary ignition source 30 may be any desired ignition source, including, but not limited to any ignitors or piezoelectric igniters or arch igniters or high voltage arch igniters. As shown in FIG. 1, this secondary ignition source 30 may thus be provided for step 114 of ensuring the spontaneous combustion of the hydrogen 16 and the chlorine 18 while momentarily separated in combustion chamber 40 via secondary ignition source 30.

In other select embodiments of method 100 for providing hydrogen chloride loop fuel reaction 10, light 28 that superheated hydrogen chloride fuel 12 is subjected to may include, but is not limited to, full spectrum white light 32, sunlight with high UV spectrum content 34, selected full spectrum UV bands 36, the like, and/or combinations thereof. Wherein, light 28 may be configured to momentarily separating the bonds of the hydrogen 16 and the chlorine 18, which may be due to a phenomenon of chlorine 18 in the presents of hydrogen 16. When the hydrogen 16 and the chlorine 18 are subjected to the full spectrum white light 32, the sunlight with high UV spectrum content 34, the selected full spectrum UV bands 36, the like, and/or the combinations thereof, this phenomenon of chlorine 18 may happen and a release of energy from the chlorine atom may bombard all the hydrogen atoms in its proximity and cause the combination to spontaneously combust. In select embodiments, light 28 that the superheated hydrogen chloride fuel 12 is subjected to may be created by UV laser light 38.

Another feature of method 100 for providing hydrogen chloride loop fuel reaction 10 may be that as the combustion takes place and the bonds of the hydrogen and the chlorine are broken, an exothermic explosion and release of energy from both the hydrogen 16 and the chlorine 18 may occur. Whereby, the chlorine 18 may also be the oxidant.

Another feature of method 100 for providing hydrogen chloride loop fuel reaction 10 may be that during step 116 of cooling of the hydrogen 16 and the chlorine 18, atom masses of the hydrogen 16 and the chlorine 18 may regroup, and electromagnetic fields recover. Wherein, chlorine's relationship with hydrogen may have a second phenomenon that chlorine holds the atom masses of the hydrogen 16 within its gravitational field and facilitates the rapid and mostly complete reorganization of a combusted hydrogen atom fusion core. As a result, the continuous use of the hydrogen chloride fuel 12 over and over is possible where hydrogen chlorine fuel 12 is combusted and the exhaust returns to the hydrogen chloride fuel 12.

Another feature of method 100 for providing hydrogen chloride loop fuel reaction 10 may be that a flame propagation of the superheated hydrogen chloride fuel 12 and its energy output is equal to that of gasoline, JP5 jet fuel, fuel oil/diesel, the like, and/or combinations thereof. Whereby, hydrogen chloride fuel 12 may be configured to be used as an economizer core for actual steam production.

Another feature of method 100 for providing hydrogen chloride loop fuel reaction 10 may be that batch production could be long term, including, but not limited to, being configured for weeks at a time of operation.

In select embodiments, method 100 for providing hydrogen chloride loop fuel reaction 10 may include step 120 of being designed and configured for a turbine/generator combination. As examples, and clearly not limited thereto, the turbine/generator combination can be used for automotive propulsion or as a standalone electrical generation or for auxiliary equipment.

Figure 2:
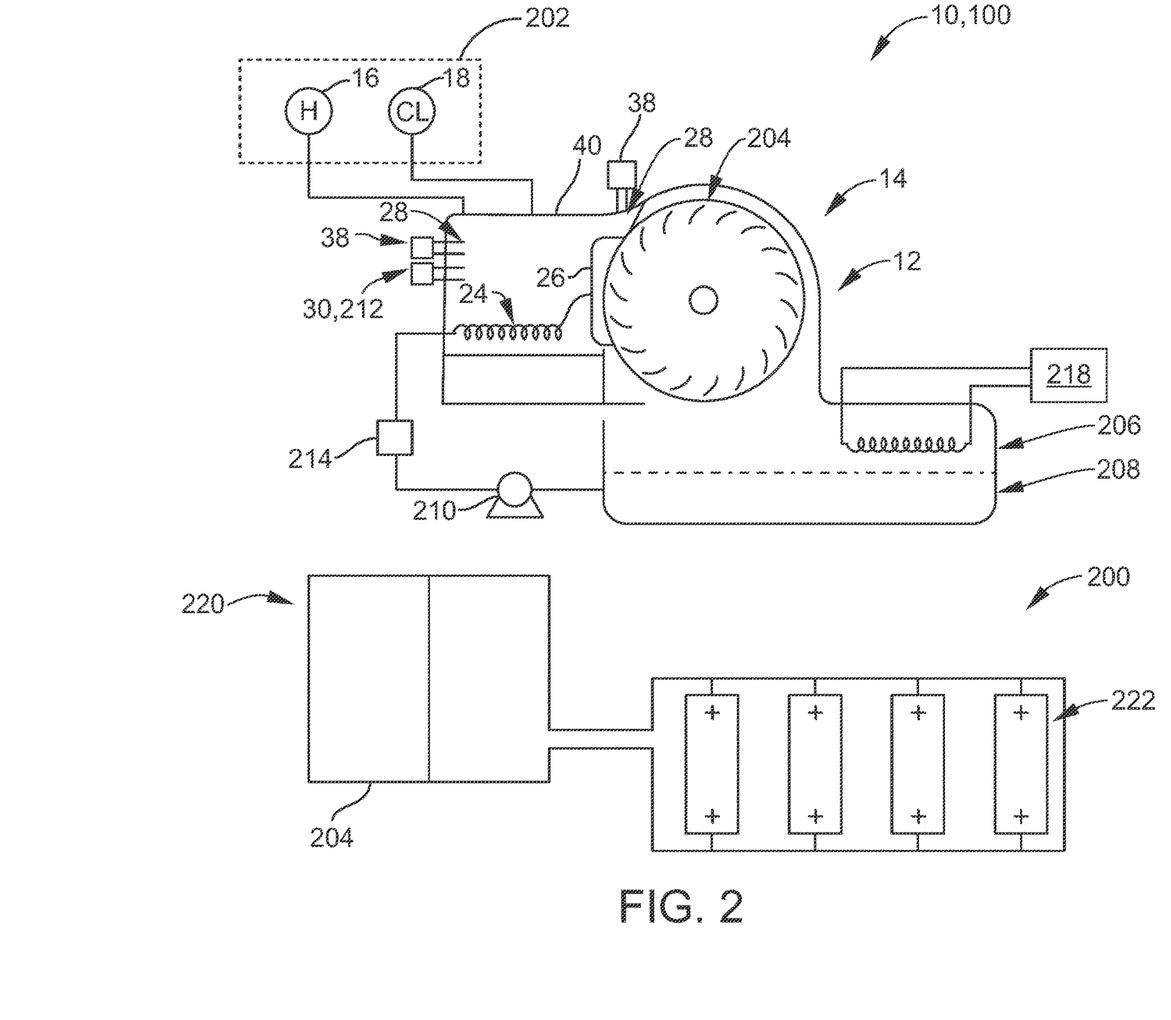
FIG. 2 shows an embodiment of the method for providing a hydrogen chloride loop fuel reaction configured for use in a thermal expansion battery with mechanical electrical generation.

Referring now specifically to FIG. 2, in other select embodiments, method 100 for providing hydrogen chloride loop fuel reaction 10 may be designed and/or configured for use in thermal expansion battery 200 with mechanical electrical generation. As shown in FIG. 2, in select embodiments, and clearly not limited thereto, thermal expansion battery 200 with mechanical electrical generation may generally include, but is not limited to: primary hydrogen and chlorine start up injection 202 for injecting hydrogen 16 and chlorine 18 into sealed furnace vessel 14 for creating hydrogen chloride fuel 12; sealed furnace vessel 14 including turbine 204 in fluid communication with primary hydrogen and chlorine start up injection 202, where turbine 204 may be, but is not limited to, a continuous set RPM turbine that is configured to throttle only to maintain generator output under load; exhaust condenser cooler 206 configured for the cooling (step 116); injection nozzle 26 for injecting the hydrogen chloride fuel 12 into turbine 204; combustion chamber 40 inside of turbine 204; UV light laser 38 for step 110 of subjecting the superheated hydrogen chloride fuel 12 to light 28 while the superheated hydrogen chloride fuel 12 is in the turbine injection nozzle 26 and in the combustion chamber 40 inside of turbine 204; cooled liquid fuel reservoir 208 for storing hydrogen chloride fuel 12; fuel pump 210 configured for circulating and looping hydrogen chloride fuel 12; secondary ignition source 30 in combustion chamber 40 of turbine 204 being piezoelectric or arch igniter 212; control valve 214 configured for shutoff; fuel superheater 24 configured for superheating hydrogen chloride fuel 12 prior to be injected into combustion chamber 40 of turbine 204; exterior cooling system 218 configured to aid in cooling; generator 220 in communication with turbine 204; thermal expansion battery 200 with compound battery bank 222; the like; and/or combinations thereof. Wherein, thermal expansion battery 200 with mechanical electrical generation may be a closed loop sealed vessel contained in a secondary containment vessel at low pressure with continuous sensor monitoring. Whereby, operating hours of the thermal expansion battery with mechanical electrical generation could be, but is not limited to, from 20,000 hours to 60,000 hours before a maintenance shutdown.

FIG. 2 shows an embodiment of the hydrogen chloride loop fuel reaction 10 configured for use in thermal expansion battery 200 with mechanical electrical generation. This turbine/generator combination can be used for automotive propulsion or as a standalone electrical generation or for auxiliary equipment. The system shown is a closed loop, or sealed vessel. Due to the possibility of chlorine exposure and possible hydrogen explosion, a secondary containment vessel may be required to contain the system at low pressure with continuous sensor monitoring. For this application, the turbine may be a continuous set RPM turbine. RPM is throttled only to maintain generator output under load. Once unit is started up it will operate until a maintenance interval shut down. Operating hours could run from 20000 hours on the low end and an objective to reach 60000 hours on the high end before a maintenance shut down.

Figure 3:
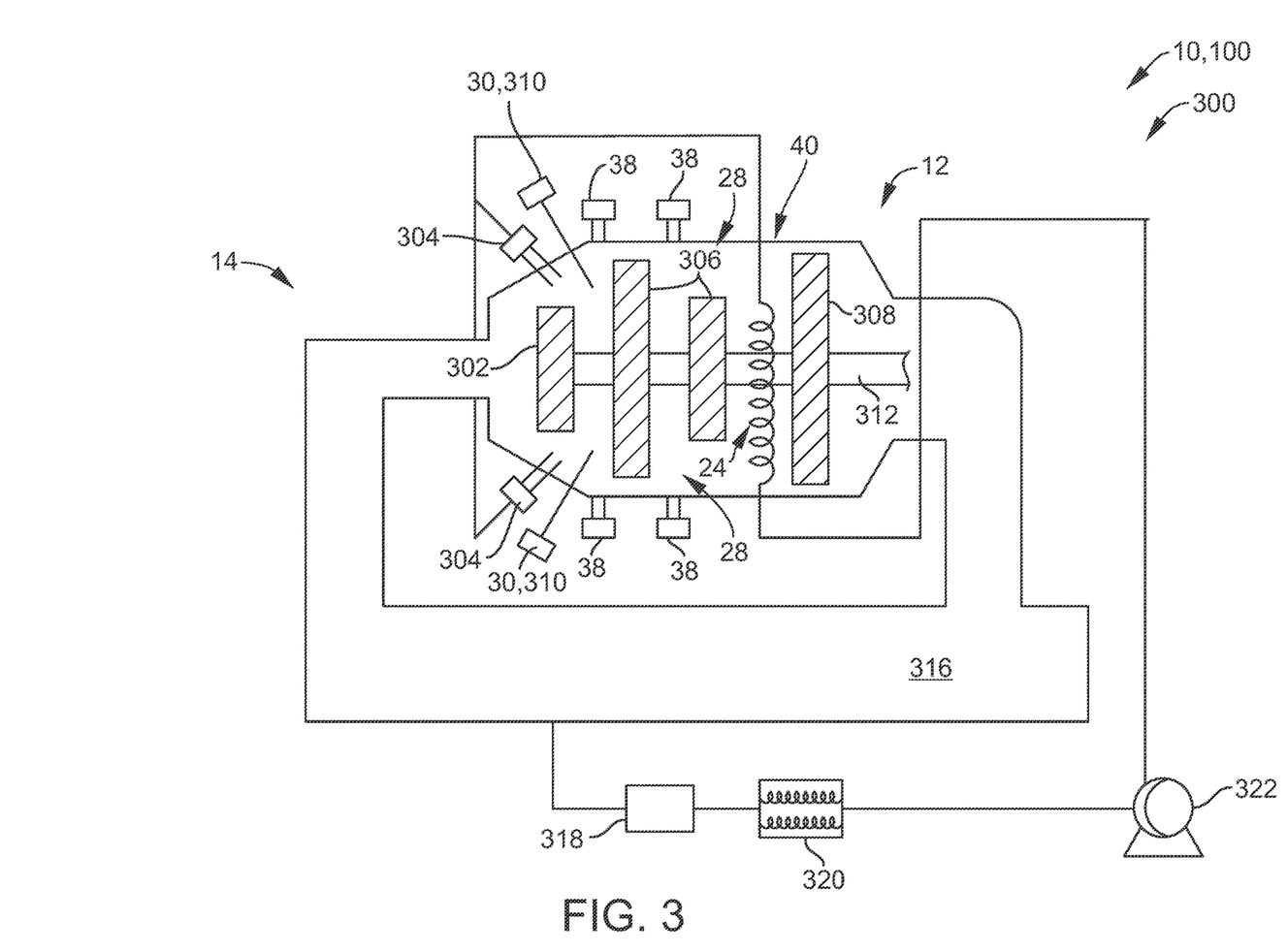
FIG. 3 shows an embodiment of the method for providing a hydrogen chloride loop fuel reaction configured for use in a jet gas turbine propulsion.

Referring now to FIG. 3, in other select embodiments, method 100 for providing hydrogen chloride loop fuel reaction 10 may be designed and configured for use in gas jet turbine propulsion system 300. As shown in FIG. 3, in select embodiments, and clearly not limited thereto, gas jet turbine propulsion system 300 may generally include, but is not limited to: fuel injector 304; compression turbine 302; combustion propulsion turbine 306 with combustion chamber 40; exhaust compressor turbine 308; UV laser 38 for subjecting the superheated hydrogen chloride fuel 12 to light 28 while the superheated hydrogen chloride fuel 12 is in the fuel injector 304 and in the compression turbine 302, and in the combustion propulsion turbine 306; secondary ignition source 30 in combustion chamber 40 of combustion propulsion turbine 306 being piezoelectric ignition 310; turbine output shaft 312 coupled to load generator 314; exhaust expansion chamber and reservoir 316; fuel compressor 318 configured to draw the hydrogen chloride fuel 12 from exhaust expansion chamber and reservoir 316; condenser and fuel supply reservoir 320; fuel high pressure pump 322; fuel super heater 24; the like; and/or combinations thereof. There may also have to be an active internal atmosphere present inside the combustion chamber 40, configured to be a condensation vessel for forced draft combustion and to facilitate the efficient transfer of heat to boiler tubes or transfer of energy to turbine blades. This atmosphere will be chlorine gas at a veritable pressure per the application.

Figure 4:
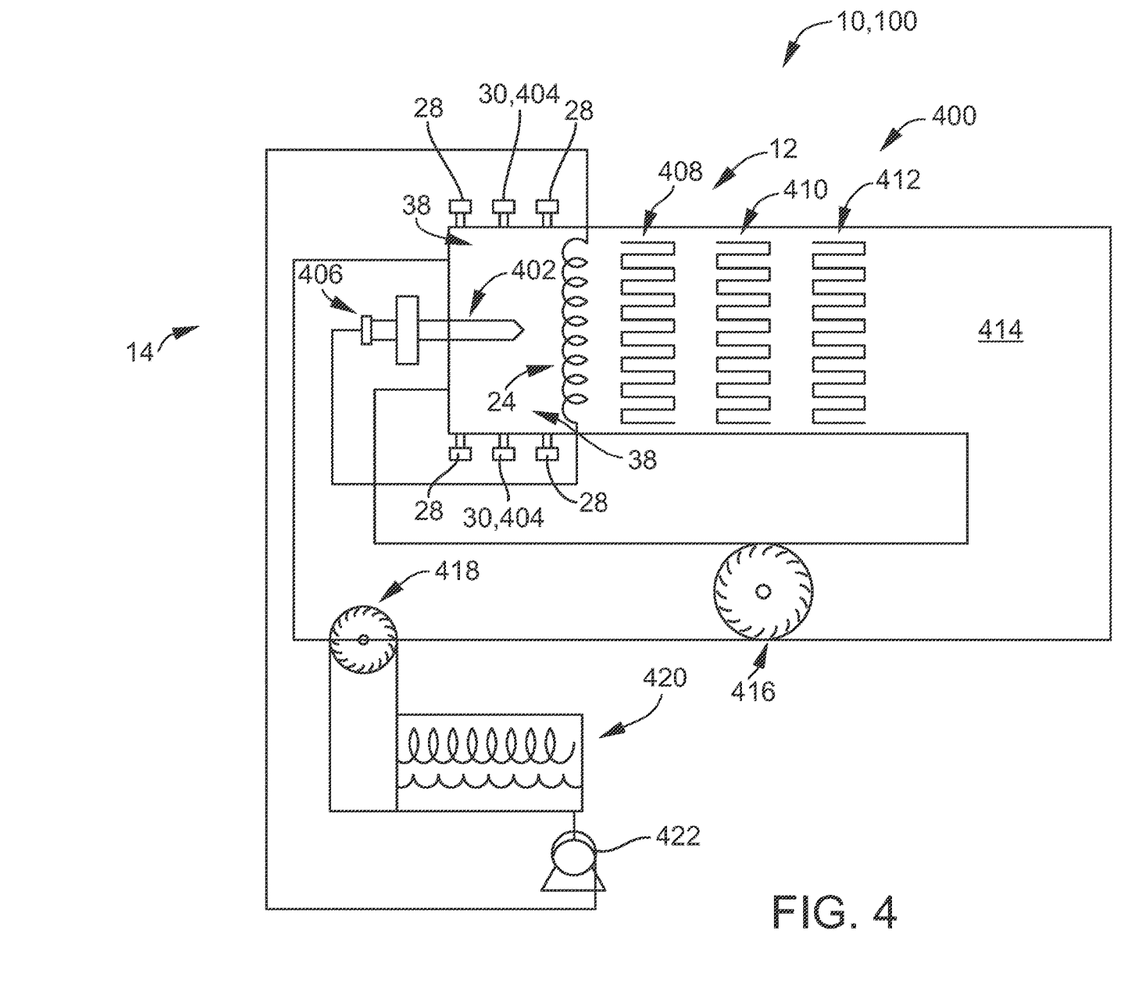
FIG. 4 shows an embodiment of the method for providing a hydrogen chloride loop fuel reaction configured for use in a tube type water vessel boiler, 600 or 1200 psi, with steam plant propulsion.

As shown in FIG. 4, in select embodiments, and clearly not limited thereto, in other select embodiments, method 100 for providing hydrogen chloride loop fuel reaction 10 may be designed and/or configured for use in tube type water vessel boiler 400 with steam plant propulsion. Tube type water vessel boiler 400 may be, but is not limited to, a 600 psi or a 1200 psi tube type water vessel boiler. As shown in FIG. 4, in select embodiments, and clearly not limited thereto, tube type water vessel boiler with steam plant propulsion 400 may generally include, but is not limited to: boiler front injector nozzle 402 configured to include multiple injectors; fuel super heater 24; secondary ignition source 30 in combustion chamber 40 being a piezoelectric ignition 404; UV laser 38 for subjecting the superheated hydrogen chloride fuel 12 to light 28 while the superheated hydrogen chloride fuel 12 is in the boiler front injector nozzle 402 and the tube type water vessel boiler 400; inlet valve 406; steam cycle super heater 408; boiler tubes 410; feed water economizer 412; exhaust expansion chamber 414; exhaust/hot gas forced draft blower 416 with a steam driven turbine configured for forcing hydrogen chloride hot gas atmosphere to return to the boiler front injector nozzle 402; exhaust condenser blower 418 with a positive ventilation to condenser fuel reservoir 420; fuel condenser and reservoir 420; high pressure fuel pump 422; and any normal steam plant support machinery including, but not limited to, a condenser, a feed pump, a fuel pump, and an auxiliary condenser and pump; the like; and/or combinations thereof. There may also have to be an active internal atmosphere present inside the combustion chamber 40, configured to be a condensation vessel for forced draft combustion and to facilitate the efficient transfer of heat to boiler tubes or transfer of energy to turbine blades. This atmosphere will be chlorine gas at a veritable pressure per the application.

Figure 5:
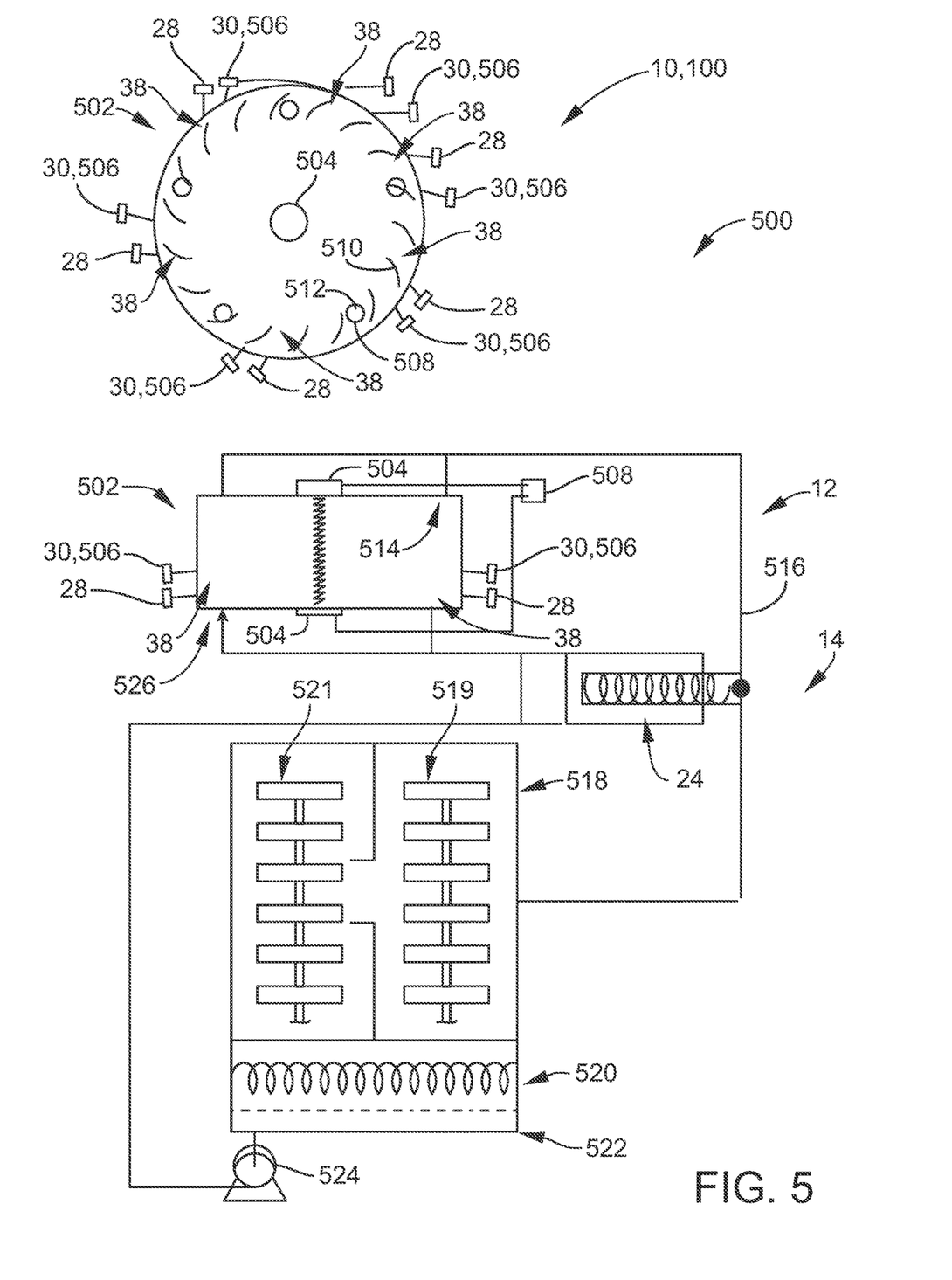
FIG. 5 shows an embodiment of the method for providing a hydrogen chloride loop fuel reaction configured for use in a fusion energy thermal reactor to operate at approximately 2000 psi to use plasma stream to drive tandem high-pressure turbine and low side velocity turbine.

As shown in FIG. 5, in select embodiments, and clearly not limited thereto, in other select embodiments, method 100 for providing hydrogen chloride loop fuel reaction 10 may be designed and/or configured for use in fusion energy thermal reactor-based steam plant based electrical generation plant 500. As shown in FIG. 5, in select embodiments, and clearly not limited thereto, fusion energy thermal reactor based steam plant based electrical generation plant 500 may generally include, but is not limited to: high-pressure fusion vessel 502; high voltage arch igniter 504; UV laser 38 for subjecting the superheated hydrogen chloride fuel 12 to light 28 while the superheated hydrogen chloride fuel 12 is in the high-pressure turbine 519 and the low side velocity turbine 521; secondary ignition source 30 in the combustion chamber 40 of the high-pressure turbine 519 and the low side velocity turbine 521, secondary ignition source 30 being piezoelectric igniter 506; transformer high voltage arch igniter 508; vortexing baffles 510; fuel inlet import 512 configured for high pressure; plasma discharge port 514; plasma supply 516 to the high-pressure turbine 519 and the low side velocity turbine 521; dual stage turbine pair 518 with high pressure turbine 519 and low pressure turbine 521; external cooling system 520; condenser and fuel reservoir 522; high-pressure fuel pump 524; fuel injector 526; fuel superheater 24 configured to use plasma to heat the hydrogen chloride fuel 12; the like; and/or combinations thereof.

FIG. 5 shows an embodiment of the hydrogen chloride loop fuel reaction 10 configured for use in fusion energy thermal reactor 500 to operate at approximately 2000 psi to use plasma stream to drive tandem high-pressure turbine and low side velocity turbine. Other configurations and auxiliary equipment could be driving off superheated high-pressure stream. This configuration may use the high-pressure plasma as the propulsion medium for turbine propulsion as it is bled off the top of the fusion vessel. Hydrogen chloride plasma may function at lower temperature than hydrogen only, 3000° f to 4000° f in the reactor and can be contained and used in this configuration. Fuel enters the lower section of the vessel into the vortexing baffle chambers with UV laser and piezoelectric igniter, and as the HCL combustion takes place, it may be subjected to a high voltage arch bringing the combustion to the plasma state. This may result in both the hydrogen and chlorine atoms to rupture their core, which could result in at least a 1/64 surface rupture of the atom, thereby, resulting in a core breach and fusion core explosion.

Although not shown in the Figures, in other select embodiments, method 100 for providing hydrogen chloride loop fuel reaction 10 may be designed and configured for use in any loop fuel low temperature fusion energy reactor.

Figures 6A, 6B:
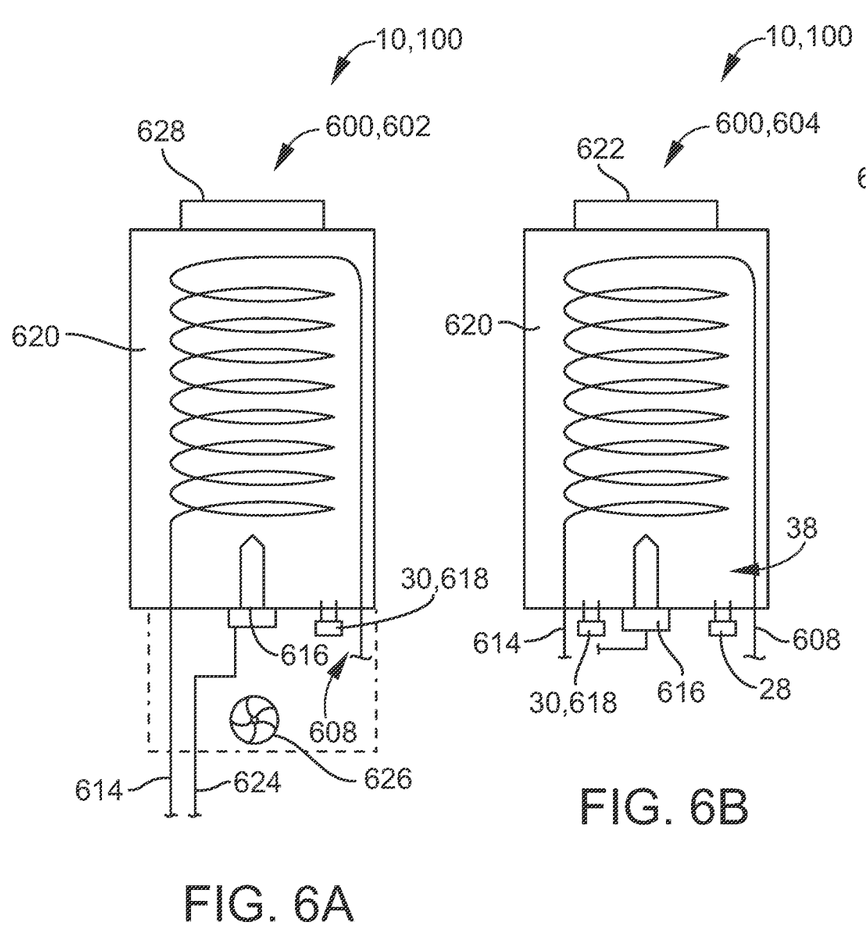
FIG. 6A shows an embodiment of the method for providing a hydrogen chloride loop fuel reaction configured for use as an auxiliary, tandem, or standalone super heater as a CNG or propane superheater according to select embodiments of the disclosure.
FIG. 6B shows an embodiment of the method for providing a hydrogen chloride loop fuel reaction configured for use as an auxiliary, tandem, or standalone super heater as a tandem or alongside superheater according to select embodiments of the disclosure.
Figure 6C:
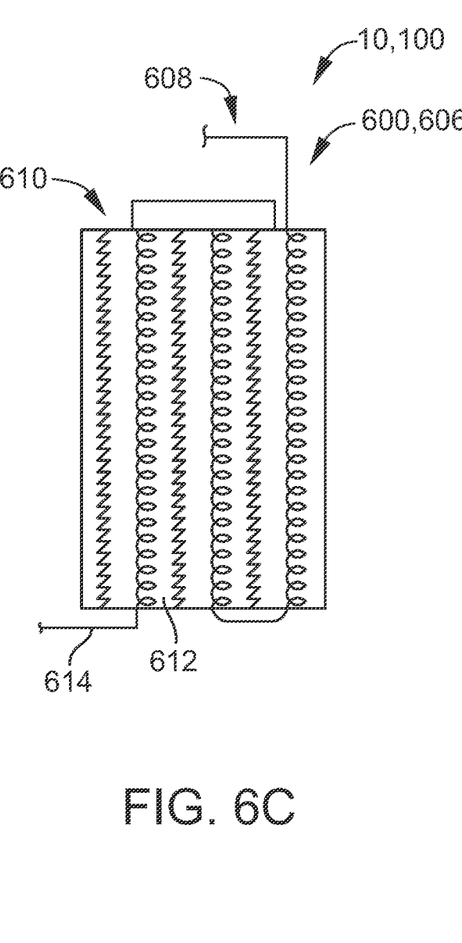
FIG. 6C shows an embodiment of the method for providing a hydrogen chloride loop fuel reaction configured for use as an auxiliary, tandem, or standalone super heater as an electrical heating coils superheater according to select embodiments of the disclosure.

As shown in FIGS. 6A, 6B and 6C, in select embodiments, and clearly not limited thereto, in other select embodiments, method 100 for providing hydrogen chloride loop fuel reaction 10 may be designed and/or configured for use in auxiliary, tandem, or standalone superheater 600. In select embodiments, and clearly not limited thereto, auxiliary, tandem, or standalone superheater 600 may be designed and/or configured for use at an initial startup until primary systems are at full operating temperature and speed. Auxiliary, tandem, or standalone superheater 600 may include, but is not limited to, CNG or propane superheater 602 (see FIG. 6A); tandem or alongside superheater 604 (see FIG. 6B); and electrical heating coils superheater 606 (see FIG. 6C).

Referring specifically to FIG. 6A, in select embodiments, the CNG or propane superheater 602 may generally include, but is not limited to: hydrogen chloride fuel flow 608 under pressure from a pump or a compressor; secondary ignition source 30 being igniter 618; superheater core 620; CNG or propane source 624; injector 616; the superheated hydrogen chloride fuel in route 614 to injector 616; blower motor 626; exhaust to atmosphere 628; the like; and/or combinations thereof. Wherein, CNG or propane superheater 602 may be configured for startup or for main operation using CNG or propane as a source of heat.

Referring now specifically to FIG. 6B, in other select embodiments, tandem or alongside superheater 604 may include, but is not limited to: hydrogen chloride fuel flow 608 under pressure from the pump or the compressor; injector 616; superheated hydrogen chloride fuel 12 in route 614 to injector 616; UV laser 38 for subjecting hydrogen chloride fuel 12 to light 28; secondary ignition source 30 being igniter 618; superheater core 620; exhaust 622 back to the main condenser; the like; and/or combinations thereof. Wherein, tandem or alongside superheater 604 may be configured to superheat more of the hydrogen chloride fuel 12 for a larger supply, where the tandem or alongside superheater 604 may be configured to use the same forced draft atmosphere as the boiler and exhaust into the same condensation stream.

Referring now specifically to FIG. 6C, in other select embodiments, electrical heating coils superheater 606 may include, but is not limited to: hydrogen chloride fuel flow 608 under pressure from the pump or the compressor; electrical heating coils 610; superheater core 612; injector for injecting the superheated hydrogen chloride fuel; superheated hydrogen chloride fuel 12 in route 614 to the injector; the like; and/or combinations thereof. Wherein, electrical heating coils superheater 606 may be configured to make a single step operation for superheating the hydrogen chloride fuel prior to injection into the combustion chamber.

Applicant notes that FIGS. 2, 3, 4, 5, 6A, 6B and 6C are in block form for the purpose of illustration of the process and basic types of propulsion applications and are not for the purpose of any actual design. Different types of auxiliary machinery may be incorporated into the systems described and not all functioning parts are pictured or described. Any use or machinery or turbines is up to the purposed applications and its engineering for the purposes of the user. All applications will require the vessel and systems to be vacuumed down for a system start up for the injection of hydrogen and chlorine gas or liquid. Shut down can be handled by controlling igniter, fuel pump and injector.

In another aspect, the instant disclosure embraces method 100 for providing hydrogen chloride loop fuel reaction 10 in any of the various embodiments and/or combination of embodiments shown and/or described herein.

Applicant notes that, although hydrogen fluoride could produce similar results as hydrogen chloride, it has been determined that there is low value in the use of hydrogen fluoride due to contamination issues. Although it has the same potential as hydrogen chloride the corrosion rate of the containment vessel is too rapid with hydrogen fluoride. This makes hydrogen fluoride uncontainable for long term use.

In sum, the present disclosure is directed toward method 100 of providing hydrogen chloride loop fuel reaction 10 that can be used for various energy applications that utilized the hydrogen chloride fuel 12, including, but not limited to: thermal expansion battery 200 with a mechanical turbine system; gas jet turbine propulsion system 300; 600 and 1200 psi boiler propulsion electrical generation plant 400; fusion energy based steam plant based electrical generation plant 500; loop fuel low temperature fusion energy reactor; auxiliary, tandem, or standalone superheater 600; the like; and/or any various combinations thereof.

Example

In the industrial production of hydrogen chloride, it is made in a special sealed furnace. At start up the furnace vessel is vacuumed out and hydrogen and chlorine are injected into the burner and ignited resulting in the effluent hydrogen chloride. Raw hydrogen chloride above approximately 700° f is still highly explosive. If this mixture was to meet atmosphere/oxygen it will explode.

At this point in the production, the HCL is cooled in a condenser to lower the temperature to a safe level that deairiated H2O can be injected (or left at full strength) to stabilize the HCL for use in most industrial processes that use HCL.

The instant disclosure is the recognition and process for looping the hydrogen chloride fuel around at the exhaust stage leaving the furnace (not condensed), where the hydrogen chloride fuel is passed through a super heater coil in direct line of the injection nozzle in the exhaust stream and super heating the hydrogen chloride and then routing it to the injection nozzle for combustion. Prior to leaving the injection nozzle and after in the combustion chamber it is bombarded with full spectrum UV laser which will momentarily separate the hydrogen and chlorine bonds and along with a secondary ignition source will insure the spontaneous combustion of the hydrogen and chlorine.

This is due to a phenomenon of chlorine in the presents of hydrogen, they have no effect on each other in the dark, but when they are subjected to full spectrum white light or sunlight with high UV spectrum content or selected full spectrum UV bands only, the phenomenon of chlorine happens and a release of energy from the chlorine atom bombards all the hydrogen atoms in its proximity and causes the combination to spontaneously combust. A second ignition source will insure combustion.

Applicant notes that during this hydrogen chloride loop fuel reaction process, chlorine is the oxidant. Generally, the three oxidative gases are oxygen chlorine and fluorine. However, typically, oxygen is used as the oxidant in all forms of combustion we use today in the use of energy. That is why the process is referred to as oxidation as chlorine and fluorine are viewed obscure to the process. As this combustion takes place and the hydrogen and chlorine bonds are broken, resulting in an exothermic explosion and release of energy from both the hydrogen and the chlorine. As the atoms begin to cool down, they form new bonds. As the atom's mass regroups and electromagnetic fields recover, chlorine's relationship with hydrogen has a second phenomenon that chlorine holds the mass of hydrogen within its gravitational field and facilitates the rapid and mostly complete reorganization of the combusted hydrogen atom fusion core. As a result, the continuous use of the hydrogen and chlorine over and over is achieved. To summarize, the hydrogen chloride fuel is used, and the exhaust returns to fuel.

The flame propagation of super-heated HCL and its energy output may be equal to that of gasoline, JP5 jet fuel or fuel oil/diesel. Hydrogen chloride furnaces for the production of industrial purpose hydrogen chloride may be built and fitted with boiler plant heat scavenging heat exchangers. Due to energy output of the process, they can be used as an economizer core for actual steam production, such as a Perry jet boiler method when the production plant is large enough that plant operation will benefit from the scavenged energy. Also, that batch production would be long term such as weeks at a time of operation.

Most applications may use pressure turbine or jet propulsion turbine using output shaft speed and horsepower to turn electrical generators or auxiliary machinery. In addition, full scale tube and tank 600 or 1200 psi boiler, may be used for the purpose of electrical generation or propulsion.

All applications may be sealed loop. They do not use atmosphere in the combustion process and therefore do not exhaust into the atmosphere. Breakdown of the metal of the containment vessel may cause vessel breach and/or fuel contamination, but the hydrogen chloride fuel can be reclaimed and recycled. A secondary containment vessel may be needed to house the combustion vessel in the case of a breach with sensors, and a nitrogen blanket could be used to help quell any ignition. The containment vessel/machine can be recycled into the normal scrap metal recycling chain.

Diabon graphite process or equivalent carbon/graphite processes can be used as a liner inside the vessel to help elevate acid breakdown of the vessel made of Licuflon steel or equivalent.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A method for providing a hydrogen chloride loop fuel reaction comprising:
    creating hydrogen chloride fuel in a sealed furnace vessel, wherein at start up, the sealed furnace vessel is vacuumed out and hydrogen and chlorine are injected into a burner and ignited resulting in the hydrogen chloride fuel in an exhaust stream of the sealed furnace vessel;
    looping the hydrogen chloride fuel leaving the sealed furnace vessel in the exhaust stream of the sealed furnace vessel including:
        super heating the hydrogen chloride fuel through a super heater coil in direct line of an injection nozzle in the exhaust stream from the sealed furnace vessel;
        routing the superheated hydrogen chloride fuel through the injection nozzle;
        subjecting the superheated hydrogen chloride fuel to light while the superheated hydrogen chloride fuel is in the injection nozzle and in a combustion chamber, whereby the hydrogen and the chlorine from the hydrogen chloride fuel are separated; and
        combusting and cooling the hydrogen and the chlorine while separated in the combustion chamber, wherein the hydrogen and the chlorine separated from the hydrogen chloride fuel provide combustion in the combustion chamber.

2. The method for providing a hydrogen chloride loop fuel reaction of claim 1, wherein the hydrogen chloride fuel is not condensed when looped.

3. The method for providing a hydrogen chloride loop fuel reaction of claim 1, wherein the combustion chamber including a secondary ignition source, the secondary ignition source is configured to ensure combustion of the hydrogen and the chlorine separated from the hydrogen chloride fuel while in the combustion chamber.

4. The method for providing a hydrogen chloride loop fuel reaction of claim 1, wherein the light that the superheated hydrogen chloride fuel is subjected to is selected from a group consisting of: full spectrum white light; sunlight with high UV spectrum content; selected full spectrum UV bands; and combinations thereof.

5. The method for providing a hydrogen chloride loop fuel reaction of claim 1, wherein the light that the superheated hydrogen chloride is subjected to is created by a UV laser light.

6. The method for providing a hydrogen chloride loop fuel reaction of claim 1 being designed and configured for a turbine/generator combination which can be used for automotive propulsion or as a standalone electrical generation or for auxiliary equipment.

7. The method for providing a hydrogen chloride loop fuel reaction of claim 1 being configured for use in a thermal expansion battery with mechanical electrical generation.

8. The method for providing a hydrogen chloride loop fuel reaction of claim 7, wherein the thermal expansion battery with mechanical electrical generation comprising:
- a primary hydrogen and chlorine start up injection for injecting the hydrogen and the chlorine into the sealed furnace vessel for creating the hydrogen chloride fuel;
- the sealed furnace vessel including a turbine in fluid communication with the primary hydrogen and chlorine start up injection, the turbine is a continuous set RPM turbine that is configured to throttle only to maintain generator output under load;
- an exhaust condenser cooler configured for the cooling;
- the injection nozzle for injecting the hydrogen chloride fuel into the turbine;
- the combustion chamber inside of the turbine;
- a UV light laser for subjecting the superheated hydrogen chloride fuel to the light while the superheated hydrogen chloride fuel is in the turbine injection nozzle and in the combustion chamber inside of the turbine;
- a cooled liquid fuel reservoir for storing the hydrogen chloride fuel;
- a fuel pump configured for circulating and looping the hydrogen chloride fuel;
- a secondary ignition source in the combustion chamber of the turbine being a piezoelectric or arch igniter;
- a control valve configured for shutoff;
- a fuel superheater configured for superheating the hydrogen chloride fuel prior to be injected into the combustion chamber of the turbine;
- an exterior cooling system configured to aid in the cooling;
- a generator in communication with the turbine; and
- the thermal expansion battery with a compound battery bank;
- wherein the thermal expansion battery with the mechanical electrical generation is a closed loop sealed vessel contained in a secondary containment vessel at low pressure with continuous sensor monitoring;
- whereby, operating hours of the thermal expansion battery with mechanical electrical generation could be from 20,000 hours to 60,000 hours before a maintenance shutdown.

9. The method for providing a hydrogen chloride loop fuel reaction of claim 1 being configured for use in a gas jet turbine propulsion system.

10. The method for providing a hydrogen chloride loop fuel reaction of claim 9, wherein the gas jet turbine propulsion system comprising:
- a fuel injector;
- a compression turbine;
- a combustion propulsion turbine with the combustion chamber;
- an exhaust compressor turbine;
- a UV laser for subjecting the superheated hydrogen chloride fuel to the light while the superheated hydrogen chloride fuel is in the fuel injector and in the compression turbine, and in the combustion propulsion turbine;
- a secondary ignition source in the combustion chamber of the combustion propulsion turbine being a piezoelectric ignition;
- a turbine output shaft coupled to a load generator;
- an exhaust expansion chamber and reservoir;
- a fuel compressor configured to draw the hydrogen chloride fuel from the exhaust expansion chamber and reservoir;
- a condenser and fuel supply reservoir;
- a fuel high pressure pump; and
- a fuel super heater.

11. The method for providing a hydrogen chloride loop fuel reaction of claim 1 being configured for use in a tube type water vessel boiler with steam plant propulsion.

12. The method for providing a hydrogen chloride loop fuel reaction of claim 11, wherein the tube type water vessel boiler is a 600 psi or a 1200 psi tube type water vessel boiler, where the tube type water vessel boiler includes:
- a boiler front injector nozzle configured to include multiple injectors;
- a fuel super heater;
- a secondary ignition source in the combustion chamber being a piezoelectric ignition;
- a UV laser for subjecting the superheated hydrogen chloride fuel to the light while the superheated hydrogen chloride fuel is in the boiler front injector nozzle and the tube type water vessel boiler;
- an inlet valve;
- a steam cycle super heater;
- boiler tubes;
- a feed water economizer;
- an exhaust expansion chamber;
- an exhaust/hot gas forced draft blower with a steam driven turbine configured for forcing hydrogen chloride hot gas atmosphere to return to the boiler front injector nozzle;
- an exhaust condenser blower with a positive ventilation to condenser fuel reservoir;
- a fuel condenser and reservoir;
- a high pressure fuel pump;
- normal steam plant support machinery including a condenser, a feed pump, a fuel pump, and an auxiliary condenser and pump.

13. The method for providing a hydrogen chloride loop fuel reaction of claim 1 being configured for use in an auxiliary, tandem, or standalone superheater configured for use at an initial startup until primary systems are at full operating temperature and speed.

14. The method for providing a hydrogen chloride loop fuel reaction of claim 13, wherein the auxiliary, tandem, or standalone superheater is selected from the group consisting of: a CNG or propane superheater; a tandem or alongside superheater; and an electrical heating coils superheater;
- wherein, the CNG or propane superheater including:
  - the hydrogen chloride fuel flow under pressure from a pump or a compressor;
  - a secondary ignition source being an igniter;
  - a superheater core;
  - a CNG or propane source;
  - an injector;
  - the superheated hydrogen chloride fuel in route to the injector;
  - a blower motor; and
  - exhaust to atmosphere;
  - wherein the CNG or propane superheater is configured for startup or for main operation using CNG or propane as a source of heat;
- wherein, the tandem or alongside superheater including:
  - the hydrogen chloride fuel flow under pressure from the pump or the compressor;
  - the injector;
  - the superheated hydrogen chloride fuel in route to the injector;
  - a UV laser for subjecting the hydrogen chloride fuel to the light;
  - the secondary ignition source being the igniter;
  - the superheater core; and the exhaust to the main condenser;

wherein, the tandem or alongside superheater is configured to superheat more of the hydrogen chloride fuel for a larger supply, where the tandem or alongside superheater is configured to use the same forced draft atmosphere as the boiler and exhaust into the same condensation stream; and wherein, the electrical heating coils superheater including:

the hydrogen chloride fuel flow under pressure from the pump or the compressor;

electrical heating coils;

the superheater core; and the injector for injecting the superheated hydrogen chloride fuel;

wherein the electrical heating coils superheater is configured to make a single step operation for superheating the hydrogen chloride fuel prior to injection into the combustion chamber.

* * * * *